(12) United States Patent
Nye et al.

(10) Patent No.: US 6,191,519 B1
(45) Date of Patent: Feb. 20, 2001

(54) SMART STRUCTURES FOR VIBRATION SUPPRESSION

(75) Inventors: Theodore W. Nye, Redondo Beach; Allen J. Bronowicki, Laguna Niguel; George R. Dvorsky, Manhattan Beach; Richard E. Wyse, Rancho Palos Verdes, all of CA (US)

(73) Assignee: TRW Inc., Redondo Beach, CA (US)

( * ) Notice: Under 35 U.S.C. 154(b), the term of this patent shall be extended for 1407 days.

(21) Appl. No.: 08/521,562

(22) Filed: Aug. 30, 1995

Related U.S. Application Data (63) Continuation of application No. 08/253,431, filed on Jun. 2, 1994, now Pat. No. 5,525,853, which is a continuation of application No. 08/007,298, filed on Jan. 21, 1993, now abandoned.

(51) Int. Cl.[7] .................... H01L 41/053; H01L 41/107

(52) U.S. Cl. .................... 310/316.01; 310/328; 310/331

(58) Field of Search .................... 310/316, 317, 310/319, 321, 326, 328, 330, 331, 332

(56) References Cited

U.S. PATENT DOCUMENTS

| | | | |
|---|---|---|---|
| 4,083,433 | * | 4/1978 | Geohegan et al. .................... 310/51 |
| 4,633,982 | * | 1/1987 | Swigert ................................ 188/267 |
| 4,795,123 | * | 1/1989 | Forward et al. .................... 248/550 |
| 4,849,668 | * | 7/1989 | Crawley et al. .................... 310/328 |
| 4,869,474 | * | 9/1989 | Best et al. ............................ 367/136 |
| 4,940,914 | * | 7/1990 | Mizumo et al. .................... 310/326 |
| 5,032,753 | * | 7/1991 | Yamaguchi et al. ................ 310/317 |
| 5,156,370 | * | 10/1992 | Silcox et al. ........................ 248/550 |
| 5,270,607 | * | 12/1993 | Terajima et al. .................... 310/316 |
| 5,347,870 | * | 9/1994 | Dasch et al. ........................ 310/319 |

* cited by examiner

Primary Examiner—Thomas M. Doughtery
(74) Attorney, Agent, or Firm—Michael S. Yatsko (57) ABSTRACT

Modular control patches including assemblies of sensors and actuators are provided to impart or control vibration of foundation members such as struts in aerospace apparatus. Local analog electronic control means is associated with each control patch assembly. Patches are attached mechanically or by chemical bonding to the outside of the struts. The corresponding electronics can be selectively removed and replaced. The patch being the sensors and actuators may also be attached or embedded with a composite structure.

30 Claims, 11 Drawing Sheets

SMART STRUCTURES FOR VIBRATION SUPPRESSION

RELATED APPLICATION

This application relates to U.S. Ser. No. 08/007,644 entitled "Digital Control of Smart Structures" filed contemporaneously with the present application. The contents of that application are incorporated by reference herein. This application is a continuation of U.S. Ser. No. 08/253,431, filed Jun. 2, 1994 now U.S. Pat. No. 5,525,853, which is a continuation of U.S. Ser. No. 08/007,298, filed Jan. 21, 1993 now abandoned.

BACKGROUND

Being able to accurately determine and control the movement of structures, particularly in aerospace is increasingly important.

This invention relates to vibration, alignment control, and health monitoring of foundation members and surfaces. In one particular aspect, the invention relates to the control of such members in aerospace applications such as the control of struts in spacecraft. The invention also has particular application in the static control of foundation members and the control of deformity of structures, for instance in aircraft and automobiles.

Space missions during the next decade will require lightweight, cost effective, high performance material systems which can achieve enhanced satellite pointing capabilities. These material systems will employ smart structure technologies. This includes active damping, passive damping, and leveraging advanced metallic and plastic composites to shape and tailor mechanical behavior.

Also, there is a need to reduce noise and vibration in vehicles, for instance, to improve comfort for passengers. By being able to alternate vibration, the structure borne sound in cars, trucks, and other passenger vehicles can be reduced.

Smart Structure Technology

Vibration control and suppression includes use of an active technology. This approach uses materials with properties that can be altered with externally applied signals. These materials are sometimes referred to as smart materials. Smart materials include wafers of piezoelectric elements such as ceramics, for example, lead-zirconate titanate ("PZT") elements. These elements are embedded into advanced composite structural foundation members composed primarily of graphite fibers with several kinds of matrix systems—epoxies, polycyanates, and thermoplastics. The members thereby become smart structures.

By applying an electric field, $\xi$ across the PZT wafer thickness, a strain, $\epsilon$ is induced into the structural member. The relationship of strain to electric field is defined as the piezoelectric strain to electric field coefficient, $d_{31}$ and is defined as $\epsilon = d_{31}\xi$. This determines the efficiency in the evaluation of PZT. The strain constant together with the PZT material modulus of elasticity, E, measures the lateral stress, $\sigma$, generated per unit field and is an indicator of the actuation force on the smart structure. This can be expressed as $\sigma = E\epsilon$ or $\sigma = Ed_{31}\xi$.

Vibration damping requires a direct method to sense strain. Piezoceramics have a high strain sensitivity. For precision spacecraft applications where nano-strains must be measured, the viable choice is PZTs. Sensing micro-strains with PZTs requires measurement of milli-volts, which is relatively easy. PZTs are also favored for environmental factors such as insensitivity to temperature. Piezoelectric sensors enjoy the further advantage that they are self-generating, producing a signal directly from strain. This makes them more power efficient, and drift is less significant.

Vibration and shape control may be achieved with a number of actuators. The specific requirements of space and vehicle vibrations make PZTs the preferred choice. Most piezoceramics produce a similar blocked force per unit field, about 0.56 lb/V-in. At maximum working field, roughly 2,000 psi of applied stress deforms a graphite layup about 50 micro-strains. This is sufficient for almost all bending vibration control applications, and some shape control requirements. Linearity of actuation is also excellent. In previous research, it has been shown that embedding PZTs in graphite virtually eliminates hysteresis due to creep. Similar to PZT sensors, actuation strength over a wide temperature range was also shown to be very uniform.

Health monitoring is achieved by transfer function measurements made between a sensor pair output and an actuator input. Changes in a characteristic transfer function measurement of a foundation member are tracked and compared over time. As a structure degrades or as damage occurs, the transfer function will change its initial signature which indicates damage has occurred. Analytic reconstruction of the theoretical strain energy in various bending modes compared to actual strain energy from the transfer function measurement can be used to physically locate the structural degradation in the foundational member. By this technique, an active health monitoring scheme can successfully detect and locate changes.

Various assemblies built for structural applications contain unacceptably low levels of damping. These structures could benefit immensely from the addition of active damping. One drawback is that the structure may already be manufactured and assembled before the need for additional damping is identified. Metallic structures that require active damping are one example.

There is a need for a discrete piezoelectric sensor/actuator assembly that can be bonded in, on or mechanically attached to a foundation member.

Throughout the evolution of smart structures using piezoelectric elements, control electronics have been a major implementation problem. Their inherent size, weight, interface cabling needs, and environment requirements have been a substantial application roadblock.

There is a need for miniature, discrete electronic controllers for use with piezoelectric elements.

SUMMARY

The invention seeks to fulfill the needs of smart structures.

According to the invention, there is provided a modular assembly control member, namely a patch, as a preformed assembly of encapsulated piezoelectric sensors and actuators. The patch may be embedded in a foundation member device during structure fabrication as it may be or it can be bonded on to an existing foundation member. A smart structure is thereby obtained.

Local control electronics for the assembly is attached through a button board interface to the assembly in either an axial or transverse arrangement relative to the actuator and sensor in the assembly. Other electrical connecting methods between the local control electronics and the patch may be used.

One local electronic controller is designed to slave to one sensor/actuator assembly as a single input, single output system. Thus, n-controllers are required for an n-assembly strut system.

The electronics applied locally to the assembly is fed by a serial power interface, laced throughout the structure to a central power converter. The local electronic control for each assembly eliminates large control wire harnesses, eliminates sensor noise contamination, and reduces electronic signal lag (limiting bandwidth). The local control electronics allows independent operation by each local controller for maximized system reliability and simplicity.

The patch effects active damping of the foundation member by detecting local strains in the foundation member. Strain detection by the patch is effected with one or more piezoelectric sensors in the patch. Strain actuation is done with a piezoelectric actuator in the patch. The sensors can be colocated with the actuator, or nearly-colocated with the actuator.

The control electronics includes three basic components to provide electronic control signals into a smart structure. The first part, or input stage, uses analog charge amplifiers that convert piezoelectric (PZT) charge to a voltage appropriate for a compensator. The second stage, a compensator, processes the signal with gains and phase shifts to dampen or cancel vibrations in the foundation member.

An analog compensator is tunable by hand and remains fixed after setting. The analog compensator stage generates an analog feedback signal for the purpose of controlling the foundation member. This signal is then fed into the third part, or drive amplifier stage, which drives the PZT actuators. The drive amplifier is a linear voltage amplifier device with phase compensation to enhance stability when driving PZT devices at high frequencies.

The invention addresses active damping, shape control, and health monitoring control electronics using analog compensators.

The invention is now further described with reference to the accompanying drawings.

DESCRIPTION

Figure 1A:
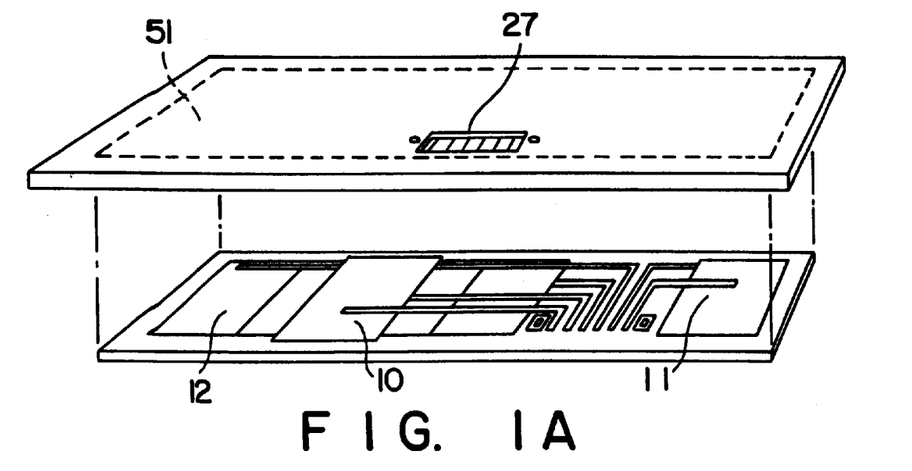
FIG. 1a is an exploded view of a first embodiment of a structural control patch construction unit.
Figure 1B:
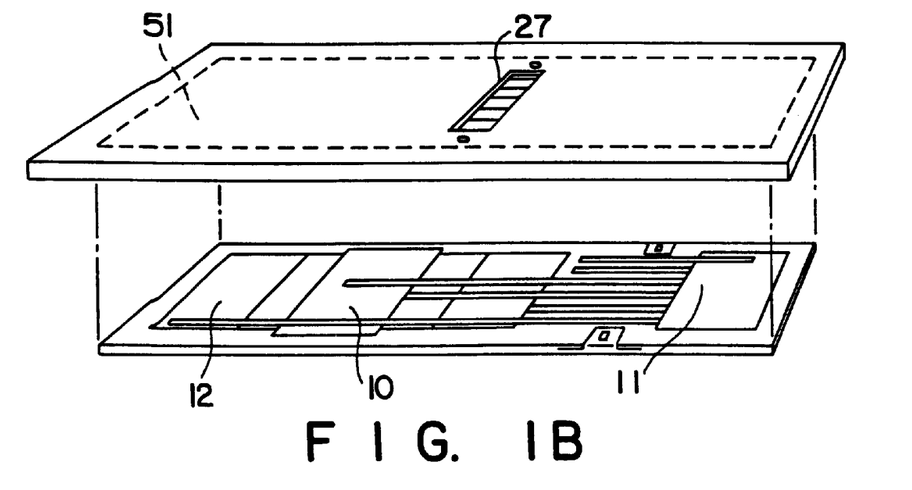
FIG. 1b is an exploded view of a second embodiment of a structural control patch construction unit.
Figure 2:
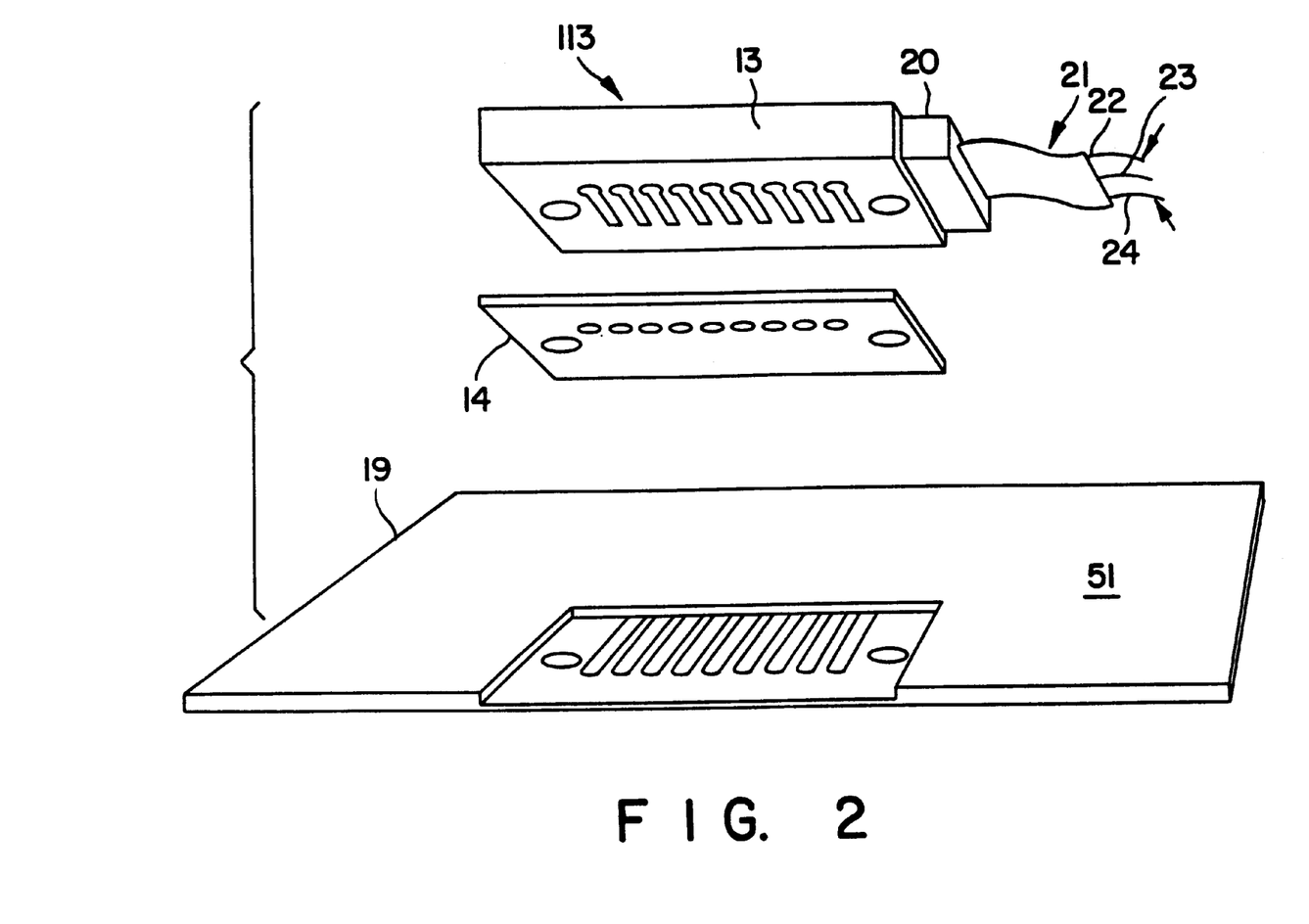
FIG. 2 is an exploded view of the electrical connections to the structural control patch unit.

A modular control patch assembly 19 for controlling strain in a foundation member is pre-formed as a unit assembly of encapsulated piezoelectric ("PZT") sensors 10 and 11 and actuators 12 as illustrated in FIGS. 1a and 1b. Control electronics 13 are attached by a button board interface 14 as shown in FIG. 2. In FIG. 1a the interface 14 is located axially, and in FIG. 1b the interface is transversely located.

Figure 3A:
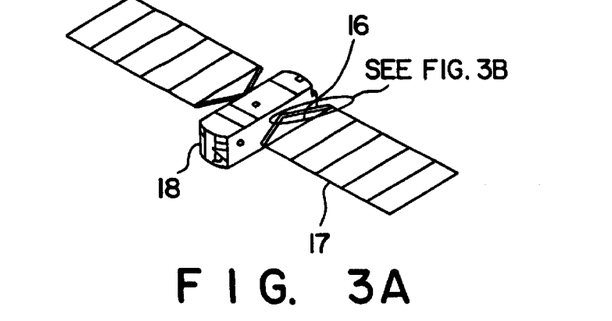
FIG. 3 is a perspective view showing modular control patches retrofitted to an existing spacecraft strut forming a foundation member thereby creating a smart structure.
Figure 3B:
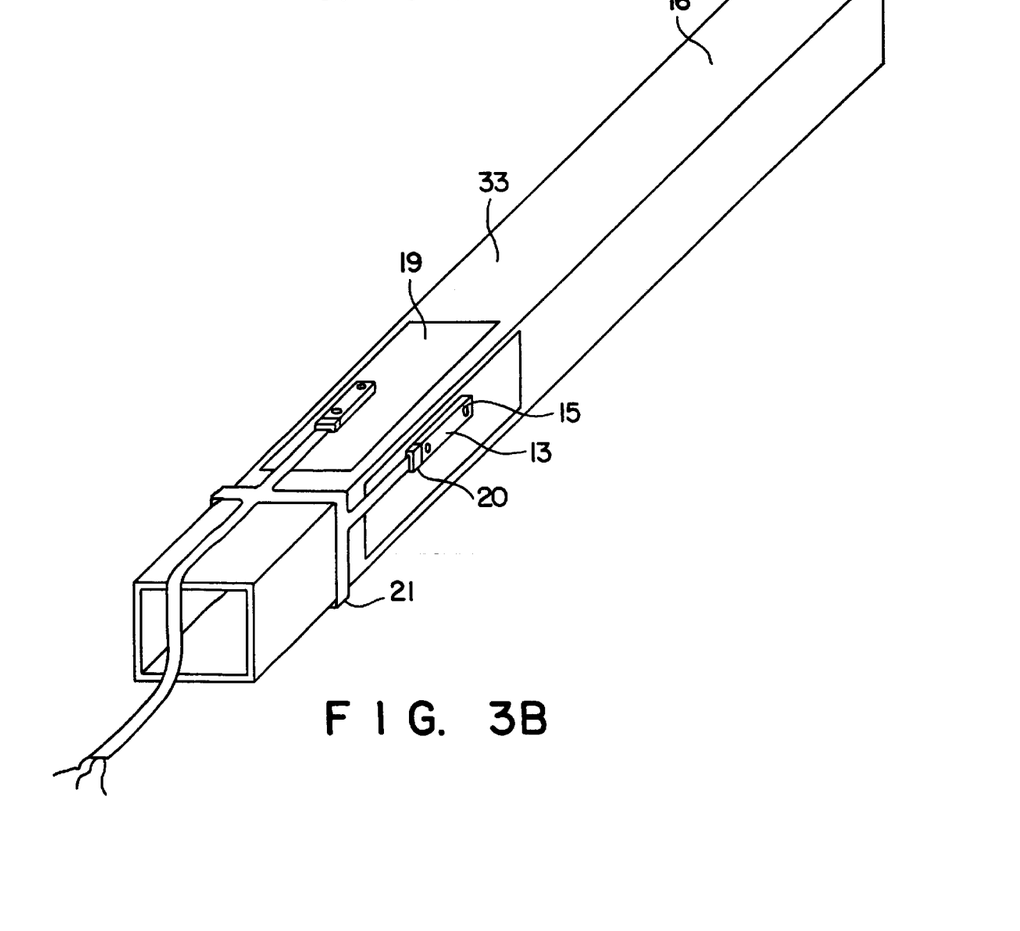

As illustrated in FIG. 3, the control electronics can be attached during construction or by retrofit to a foundation member 33 with an axially displaced mechanical fastening means 15. FIG. 3 illustrates an existing metallical or composite spacecraft strut 16 as the foundation member 33 supporting a solar array 17 in a spacecraft 18. The retrofit module control patch units with embedded piezoelectric sensors and actuators are bonded to the strut 16.

Mechanical fasteners 15 attach the control electronics 13 to the modular control patch assemblies 19. The control electronics 13 is modular and is applied locally to each control patch assembly 19. There is a micro-miniature interface connector 20 with the local electronics 13 and a central electronic control remotely located from the assembly 19. From the connector 20 there is a flat ribbon flex harness 21 connecting the local electronics 13 of the modular control patch unit 19 with the external remote electronics which may be a main computer on the spacecraft 18 or a power source on the spacecraft 18. Such a system can provide the unregulated power lines 22 and 23 and a serial input/output interface line 2 for central command communication between the central electronic control and the local remote control electronics 13.

Mechanical connections of the local control electronics 13 is effected by the button board interface 14 as shown in FIG. 2. This attachment method allows for a strain forgiving electrical interface to the structural member. The button board interface connector 14 is described under U.S. Pat. No. 4,581,679, the contents of which are incorporated by reference herein. Other electrical connecting methods between the control electronics 13 and the assembly 19 may be used.

Control Member Assembly

Figure 4A:
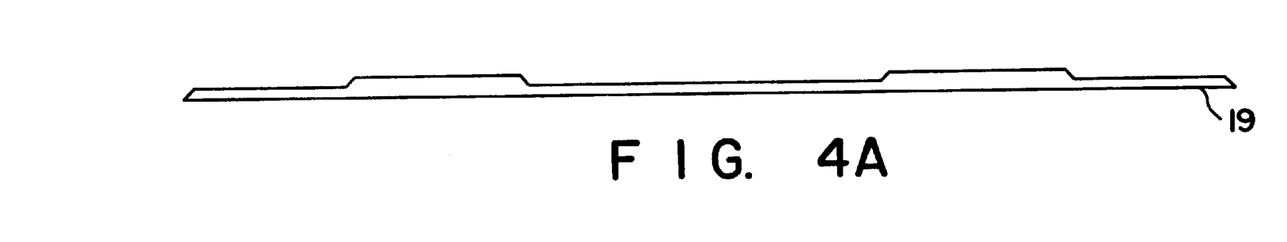
FIG. 4a is a side view of a control patch unit.
Figure 4B:
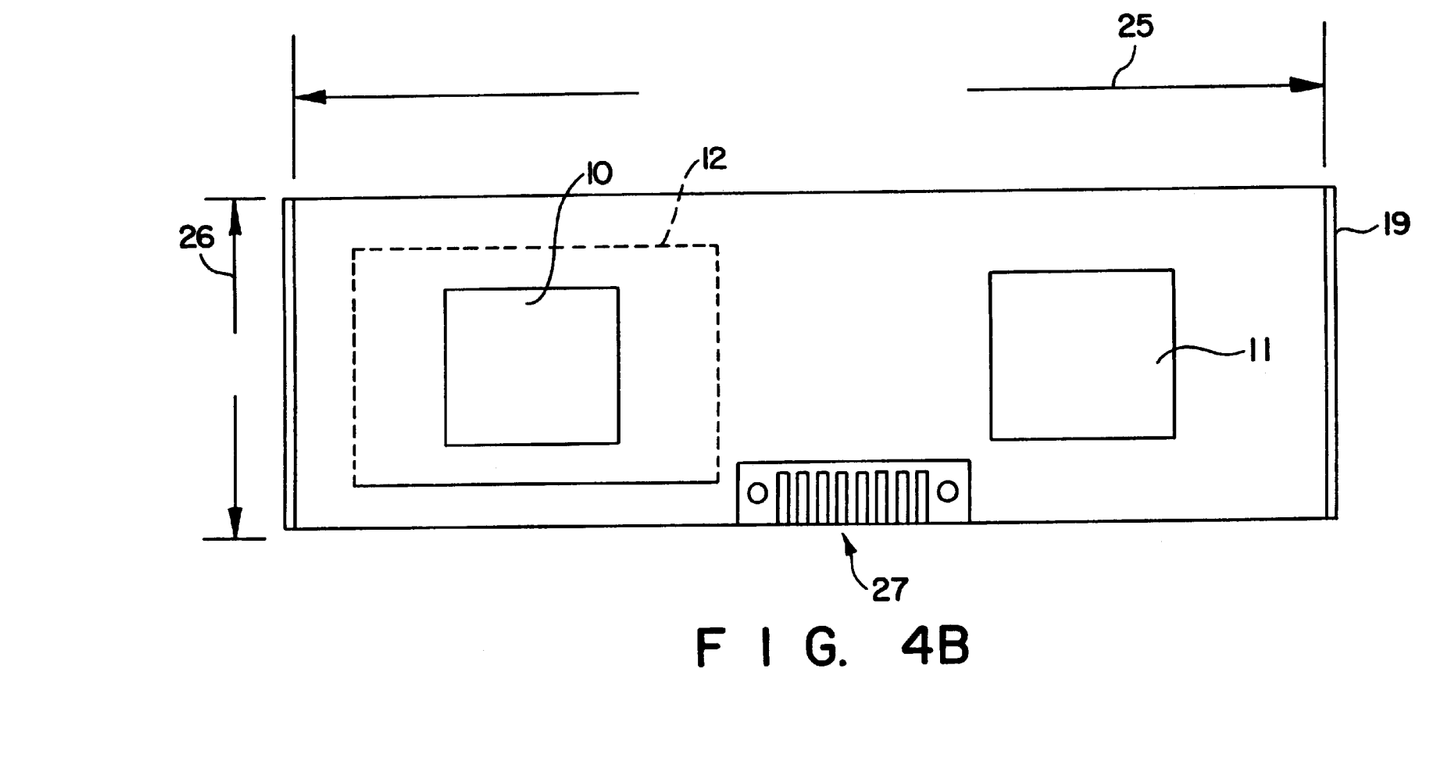
FIG. 4b is a top plan view of a control patch unit.

The modular control patch assembly 19 as illustrated in FIGS. 4a and 4b is a relatively thin element which is about 6" in length 25 and about 2" in width 26. The height is about 0.125". The control patch 19 includes at least one PZT sensor 10 with at least one PZT actuator 12, both mounted in back-to-back electrical polarity relationship. The PZT sensor may be colocated sensor 10 with the actuator. Also located as part of the patch 19 is a nearly-colocated PZT sensor 11 which is mounted transversely relative to the colocated sensor 10. Both colocated sensors 10 and nearly-colocated sensors 11 may be used. The actuator 12 measures about 0.0075"×1.5"×2.5" in size. The sensors 10 and 11 measure about 0.0075"×1"×1" in size. There is a cut-out implant 27 in a graphite overwrap 28 for the interface button board 14. The cut out 27 measures about 0.536"×1.5" wide for each control patch unit.

Figure 9:
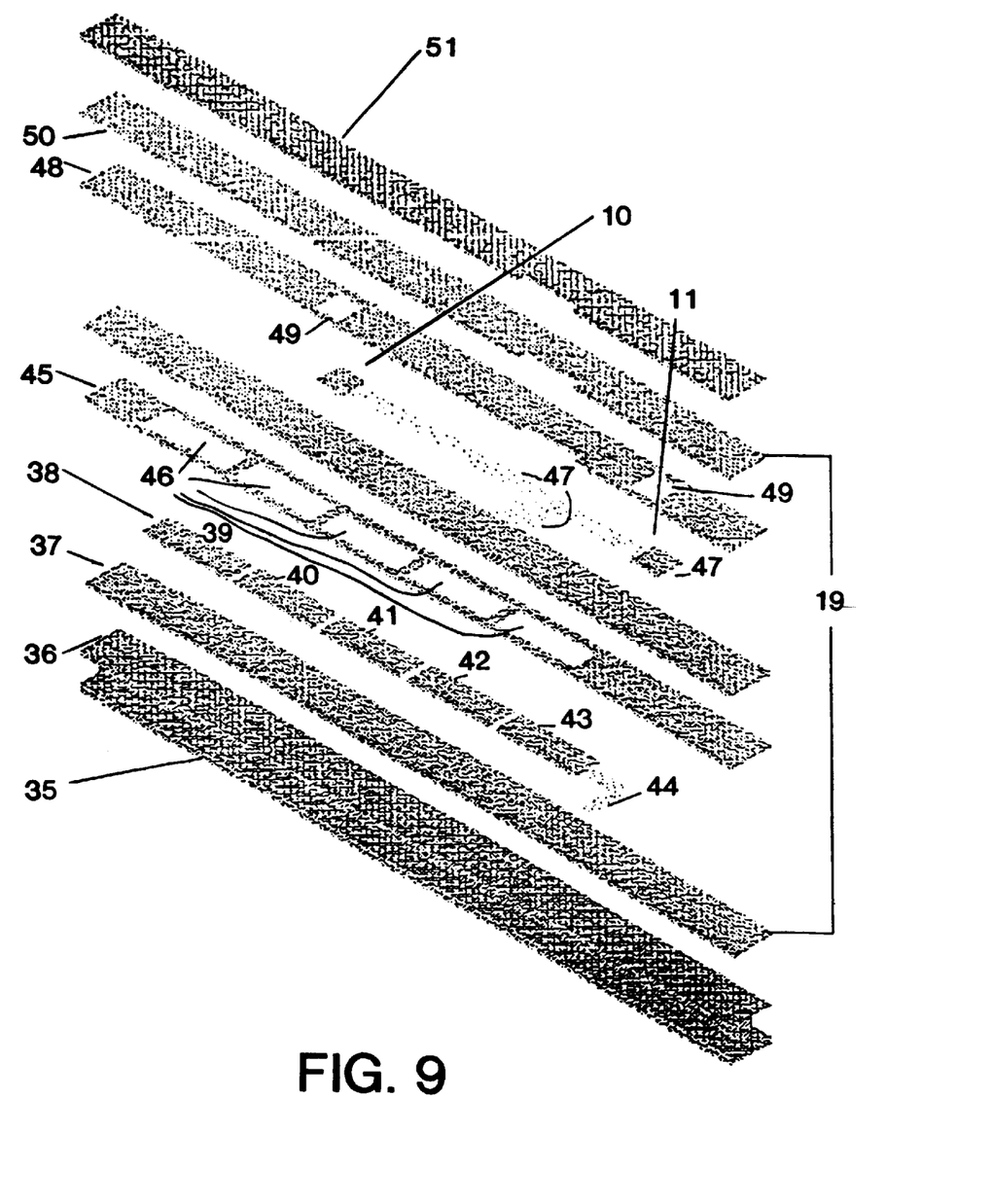
FIG. 9 is an exploded perspective view of a smart strut illustrating the relationship of an I-beam foundation member with the components and encapsulating layers of the patch unit, and an overtape.

A layout of a typical smart strut is shown applied to an I-beam foundation member in FIG. 9.

The smart strut as illustrated in FIG. 9 is a graphite I-beam 35 with a surface 36 acting as the foundation member 33 (FIG. 3). The unit 19 is constituted by a based formed by an encapsulated material 37. Above that material 37 there is an actuator string 38 having actuators 39, 40, 41, 42, and 43 with output lines connectors 44. Above the actuator string 38, there is an encapsulation material 45 through which there are spaces 46 for the actuators 39–43 to be relatively exposed. Above the encapsulated material 45 there is a colocated sensor 10 and a nearly-colocated sensor 11 which are spaced apart and connected electronically as indicated by lines 47. Encapsulating material 48 with windows 49 and a further encapsulating layer 50 are located over the sensors 10 and 11. Finally, the unit 19 is over-wrapped with a graphite tape overwrap 51 located over the encapsulating material 50.

Control Electronics

Figure 5:
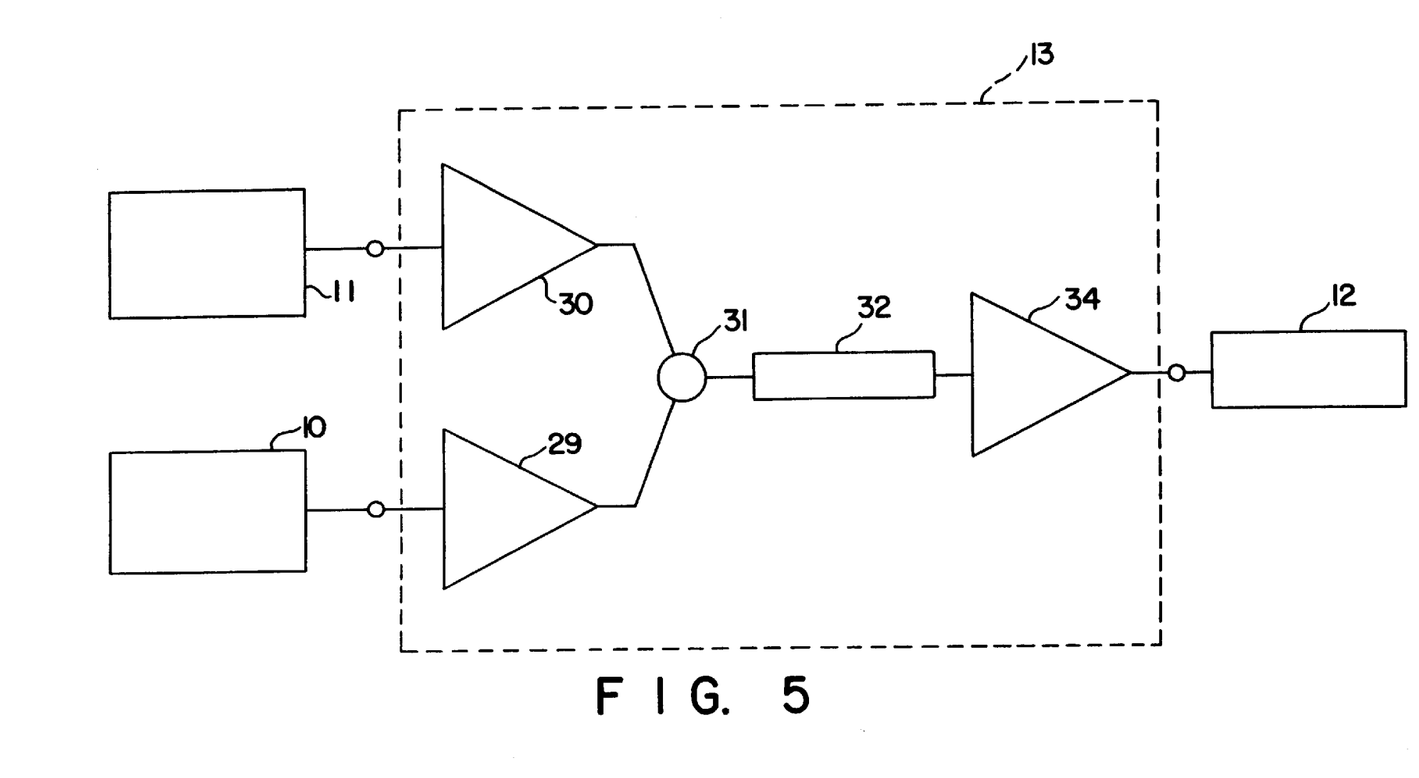
FIG. 5 is a schematic illustrating the basic components of the control electronics for a structural control patch unit.

The basic components of the control electronics 13 for the patch 19 includes a pair of sensor charge amps 29 and 30. The sensor charge amp circuit 29 is connected to receive signals from the sensor 10, and the charge amp circuit 30 is connected to receive signals from the sensor 11. The outputs of these amps circuits 29 and 30 are directed to a summer 31 which is connected with a compensator 32. The procedure of averaging two sensor signals to achieve a desired dynamic characteristic is described in U.S. Pat. No. 5,022,272 entitled "Locally Compensated Deformation Sensor." The output from the first stage, namely from amplifiers 29 and 30 converts the PZT charge from the sensors 10 and 11 to voltages appropriate for the compensator 32. The compensator 32 processes the signal with an appropriate gain and phase shift and cancels vibrations in the foundation member 33. The compensator 32 is analog device. The output of the compensator 32 is directed to a drive amp 34 which, in turn, outputs a signal to the PZT actuator 12. The drive amplifier 34 is a linear voltage amplifier device with phase compensation to enhance stability when driving PZT devices at high frequencies.

Figure 6:
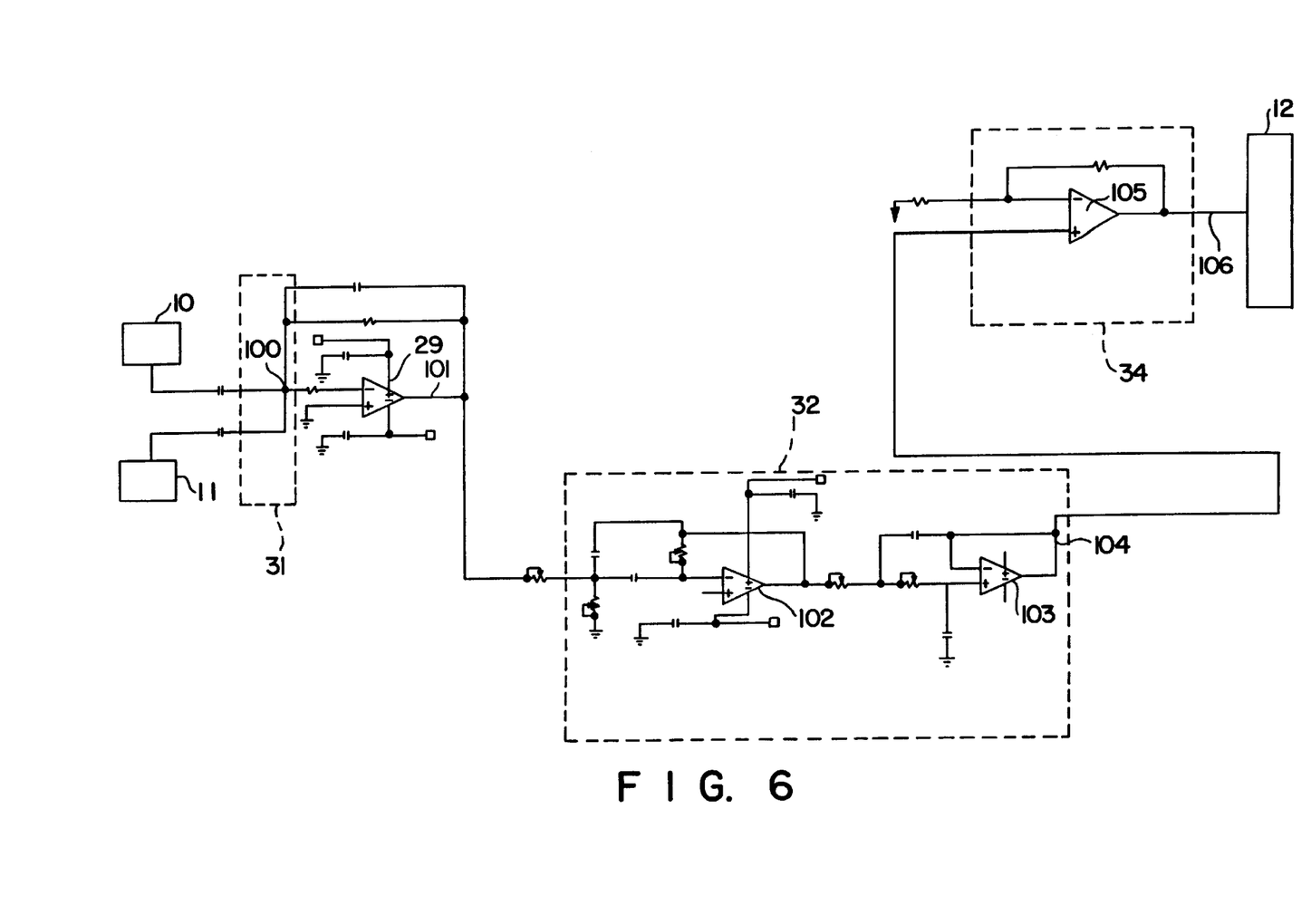
FIG. 6 is a schematic illustrating a first embodiment of the analog control electronics.
Figure 7:
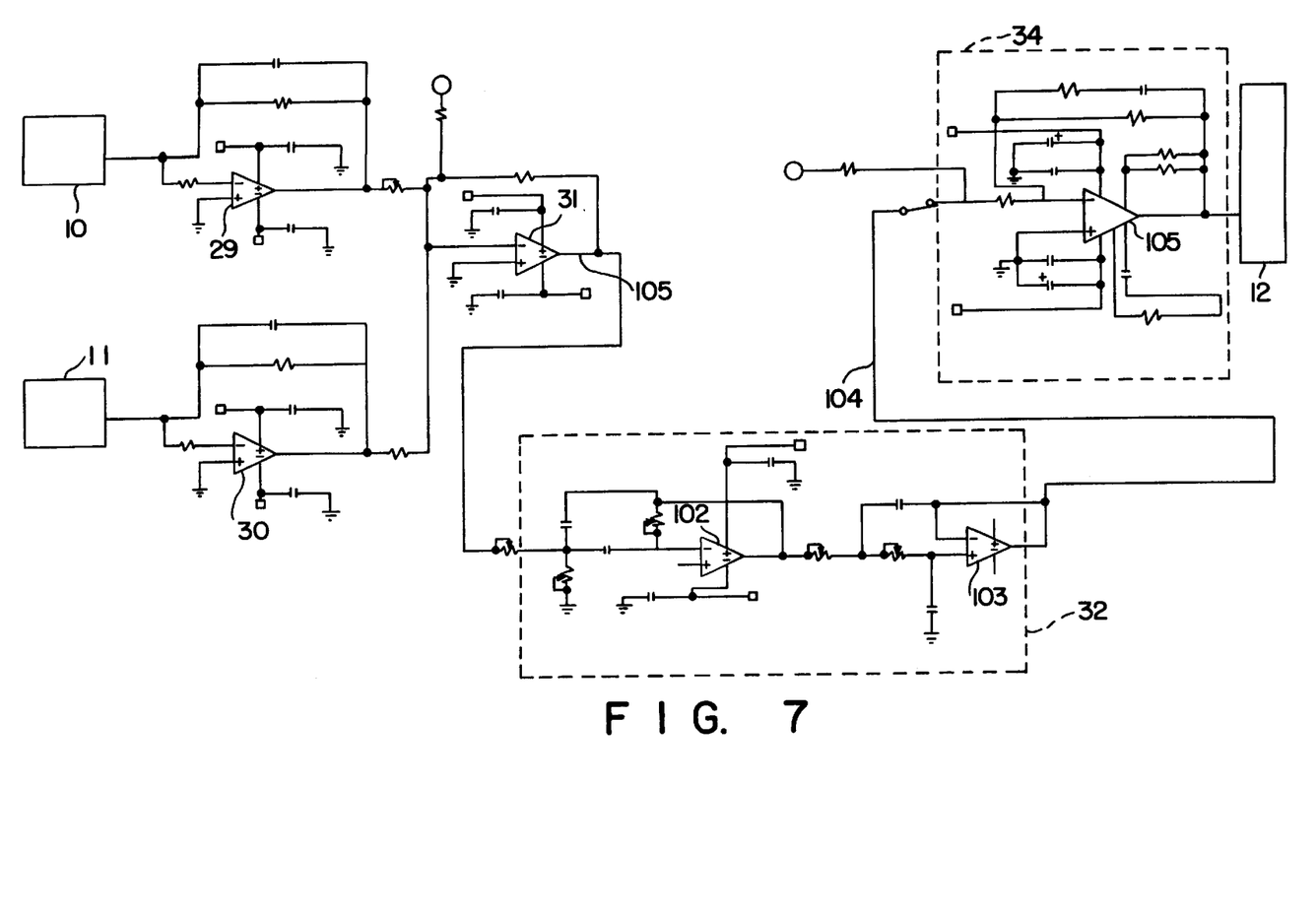
FIG. 7 is a schematic illustrating a second embodiment of the analog control electronics.
Figure 8:
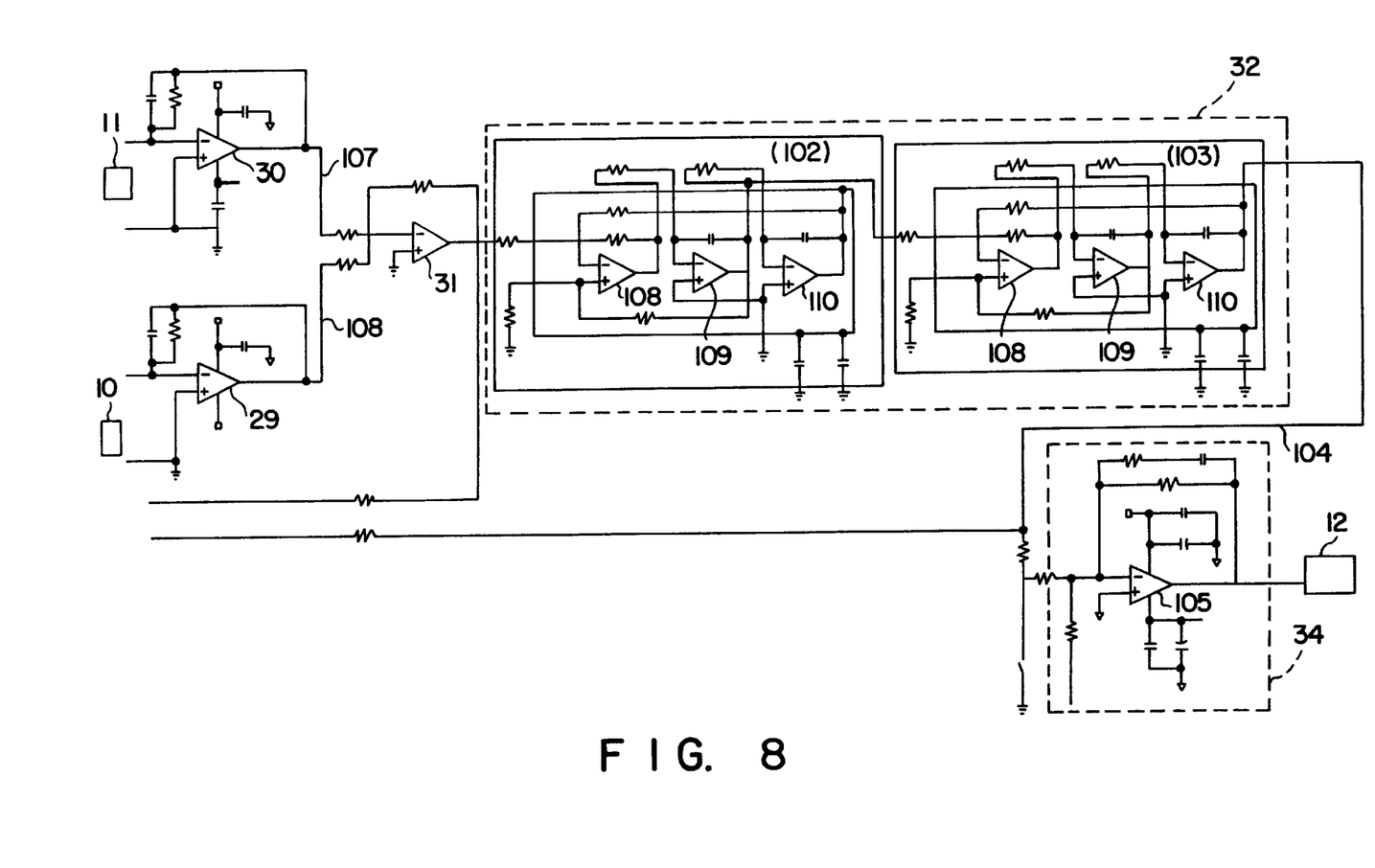
FIG. 8 is a schematic illustrating a third member of the analog control electronics.

There are several possible versions of the control electronics using analog compensators 32. All of these operate with the modular control patch 19. Schematics of these controls are shown in FIGS. 6 to 8. Each of the designs employs the basic features of the control electronics 13 depicted in FIG. 5, except that there are different components and configurations of charge amps circuits 29 and 30, analog compensator 32, and drive amps circuits 34. The analog control provides active damping to the foundation member 33 thereby creating a smart strut.

Active damping is implemented by enforcing a 90° phase lag to the structural system, measured from the PZT sensors 10 and 11 and applied by the PZT actuator 12. FIG. 5 shows a simple schematic of the electronic architecture designed to accomplish this task. The input stage of charge amplifiers 29 and 30 supplies the appropriate gain and filtering for the compensator 32. The compensator 32 in turn, implements a control law or electronic filter, which creates the phase shift to which the foundation 33 will damp in response. The signal is then fed into a third stage drive amplifier 34, which again filters and boosts the phase lagged signal to directly drive the PZT actuators 12. One controller 13 is designed to slave to one foundation member 33 strut as a single-input, single-output system. Thus, for a strut system using n-control patches 19, there are n-controllers 13.

General Architecture of Active Damping, Control Electronics

Active damping includes an arrangement and use of actuators 12, colocated sensors 10 and nearly-colocated sensors 11. Colocated sensors 10 are placed approximately centrally and located axially as the actuators 12. A colocated sensor 10 produces structural transfer functions with alternating poles and zeros, resulting in no relative phase difference between modes. Nearly colocated sensors 11 are desirable since they are used to generate arbitrary zero locations in the structural transfer function. These nearly-colocated sensors 11 are appropriately averaged with the colocated sensors 10 to set relative phasing between structural modes. This optimizes the performance of certain control algorithms (i.e., allows a single feedback loop to damp multiple modes).

There are several advantages to the local controller electronics 13 approach. Each active strut 16 with embedded sensors 10, 11 and actuators 12 requires a minimum of six (or a maximum of twelve) shielded analog wires. Encapsulation of the PZT sensors and actuators and the sensor cables in conductive graphite-epoxy layers results in a "Faraday cage" effect which protects low level sensor signals from electromechanical interference and spacecraft charging.

The control components of patch 19 and control electronics 13 are assembled onto a small printed circuit board. Power required for one controller 13 was approximately 1 watt while idle, and 5 watts while damping the foundation member 33 (depending on strut disturbance displacements). Voltages required are 15 volts for the charge amps 29 and 33, and ±60 volts for the drive amp 34. The electronics board measures approximately 0.6"×2.5"×4.0".

With local control electronics 13, namely distributed microcontroller electronics 13 with each unit 19 connected to a single, serially connected, power supply cable 21, there is created a simple, minimum integration-effort design. Contrarily with the prior art technique, combining a few smart struts 16 onto a spacecraft 18 and interfacing them to a central global controller results in a bulky harness that makes active damping prohibitive.

Control Electronics Components

Three key components comprise the local active damping control electronics. These components, or stages, are shown in FIG. 5.

The first component consists of a charge amplifier stage 29 and 30, whose purpose is to convert charge generated by the piezoelectric sensor elements 10 and 11 to voltage. One charge amplifier is generally used for each piezoelectric sensor although there are situations where two or more sensor charges are summed prior to the charge amplifier and only one amplifier is used. Charge amplifiers are available from various suppliers and in a variety of packages. Commercially available versions of the Linear Technology LT1012, NSC-LM660, and Burr-Brown OPA 111 charge amplifiers.

Voltages exiting from the charges amplifiers are generally summed together with a summing amplifier, may be filtered to remove high frequency noise, and are then fed into the compensator.

The second key component is the compensator 32. The compensator introduces a 90° phase lag into the electrical signal at mechanical resonance of the controlled structure. It is this signal that effects damping in the foundation member and creates the smart structure. An analog compensator 32 can be regarded as a filter (or series of filters) to create the phase shift over structural resonance points of interest. Analog filters have the characteristic of being tuned by varying the cutoff frequency—$f_W$ and amplification factor—Q. Mechanically, this occurs by changing capacitors and/or adjusting resistors (usually trim pots). This has advantages and disadvantages depending upon a specific application.

Generally, an analog component is a fixed design. Once tuned, the compensator 32 does not need to be modified unless the smart structure has changed. Small changes in the controlled structures stiffness will result in the compensator 32 appearing "de-tuned". This causes reduced damping performance or possibly instability in the control circuit.

The last key component of the electronic control is the drive amplifier stage 34. It converts the input command voltage from the compensator 32 into a charge that can actuate the piezoelectric actuator 12. Commercially available versions of series linear drive amplifiers such as the APEX, PA88 and PA89 have been used almost exclusively.

The smart strut piezoceramic actuator has a large capacitance, on the order of $\mu$-Farads. At higher frequencies (kHz), it becomes increasingly difficult for the drive op amplifier 34 to supply the current required to maintain the ceramic at its commanded voltage. The capacitive load induces a pole (or resonance) in the driver transfer function. This occurs in series with a pole in the op-amplifier gain curve to produce a 180° phase shift at a critical frequency, and oscillation can occur. This oscillation has been measured, and has also been predicted analytically. A lead-lag circuit in the op-amplifier feedback is one approach used to overcome this instability. The lead-lag acts to drop the gain before the instability frequency, while at the same time including a 90° phase lead which adds to phase margin. Thus, high frequency instability problems encountered in the drive amplifier 34 have been alleviated and excellent performance up to several kHz has been demonstrated.

Exemplary Control Electronics

A first analog control electronics schematic 13 depicted within the dashed outline is represented in FIG. 6. The two sensors 10 and 11 direct their output charge signals in parallel to the input 100 of a single charge amplifier 29 which also effects the summing 31. The output voltage is sent along line 101 to the compensator 32 which is connected by two elements: a band pass filter 102 and a low-pass filter 103 which are connected in series. The output from low-pass filter 103 is directed along line 104 to the drive amplifier circuit 34 which is formed by a driver amplifier 105. The output 106 from the drive circuit 34 is a control signal to the actuator 12. In some cases, the amplifiers constituting the charge amp 29, band pass filter 102, and low-pass filter 103 can be constituted as part of a quad amplifier unit.

A second analog embodiment of the control electronics 13 is illustrated in FIG. 7. Signals from sensors 10 and 11 are directed to respective charge amplifiers 29 and 30 and in turn to a summer amplifier 31. The output 101 from the summer 31 is directed to the compensator 32 formed by the band pass filter 102 and low-pass filter 103 arranged in a Salen Key Filter configuration. The output line 104 is directed to the power amp driver 105 of the drive circuit 34. The band pass amp 102 and lo-pass amplifier 103 are arranged in a linear mode for stability and to prevent oscillation: as the Q changes, the frequency also changes.

A third analog embodiment is illustrated in FIG. 8, and uses a universal active filter. Signals from sensors 10 and 11 are directed to charge amplifiers 29 and 30 respectively, and their outputs 107 and 108 are directed to the summer amplifier 31. The compensator 32 is formed by a band pass filter 102 in series with a low-pass filter 103. Each of the filters 102 and 103 includes a summing amplifier 108 followed by two integrator amps 109, and 110, respectively. The output 104 from the compensator 32 is directed to the drive circuits 34 using a power amp driver 105. The filters 102 and 103 are established in a highly accurate mode such that the Q can be varied independently of the cut off frequency f.

Example

Figure 10:
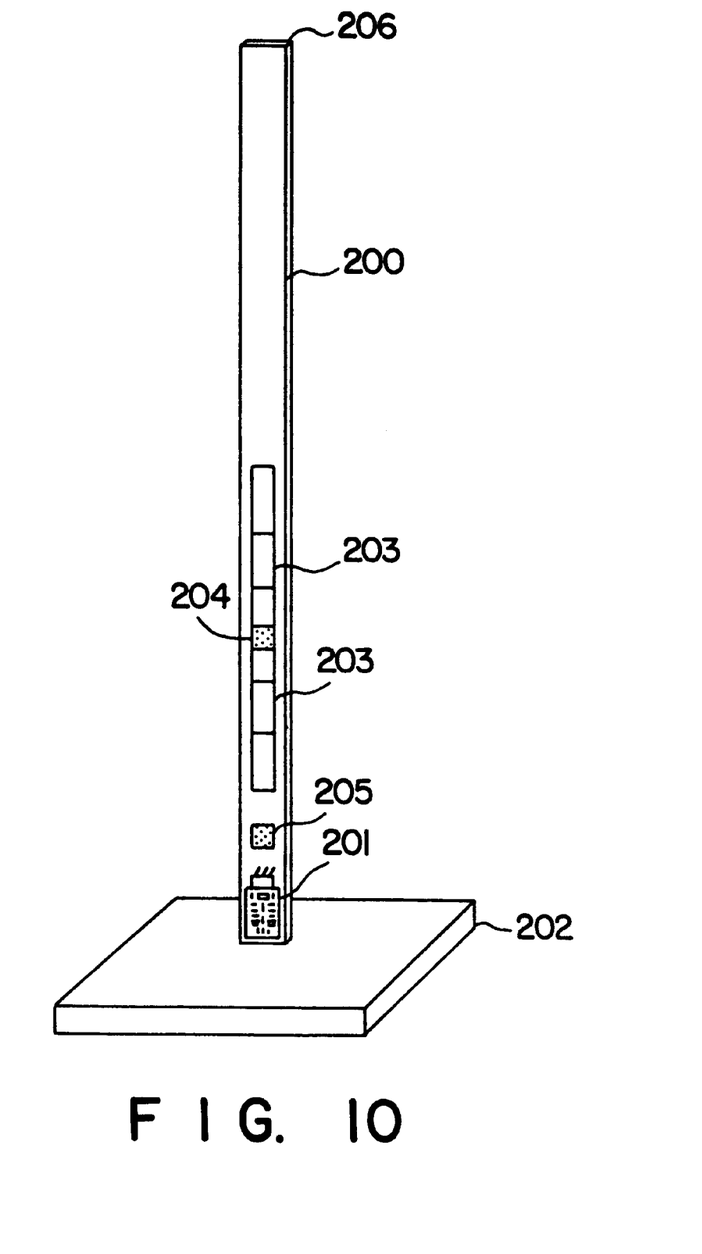
FIG. 10 illustrates the test set up of a cantilever strut as the foundation member being a smart structure equipped with analog smart patches.

A single cantilever beam 200 setup with an attached analog electronics control patch 201 is mounted on a steel base 202 and is illustrated in FIG. 10. There are embedded PZT actuators 203, an embedded colocated PZT sensor 204, and a nearly-colocated embedded PZT sensor 205 distributed along the beam 200.

Figure 11A:
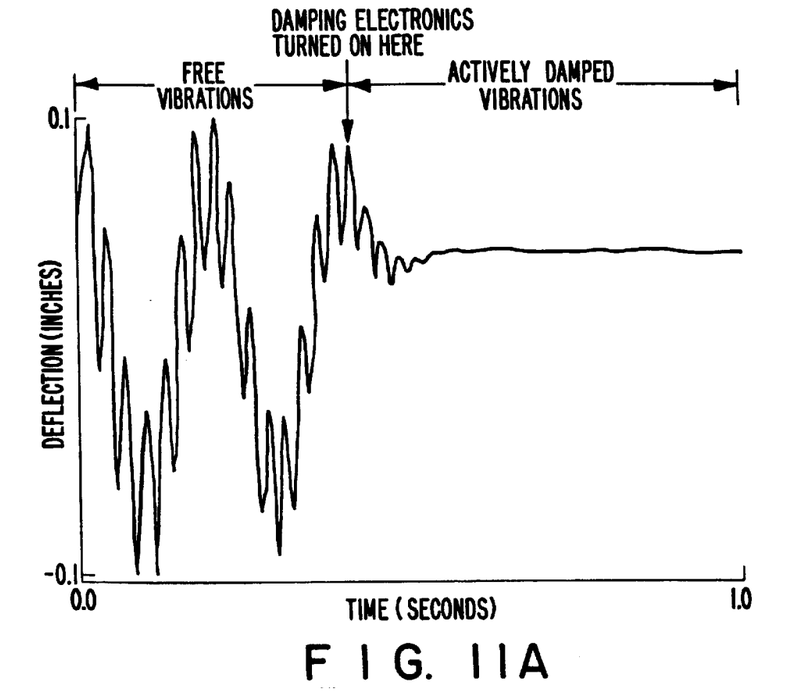
FIG. 11a is a graphical representation of the cantilever strut under free vibration response showing the change of deflection over time, before and after damping.

In the relationship, the analog patch 201 controls free vibration displacements of the tip 206 of the beam 200 as shown in the time domain plot of FIG. 11a. Tip displacements are characterized by a large amplitude repeating waveform, representative of the first beam bending mode. The higher frequency, lower amplitude wave, superimposed on the first, represents the second beam bending mode. Both beam bending vibrations end abruptly when control power is applied.

Figure 11B:
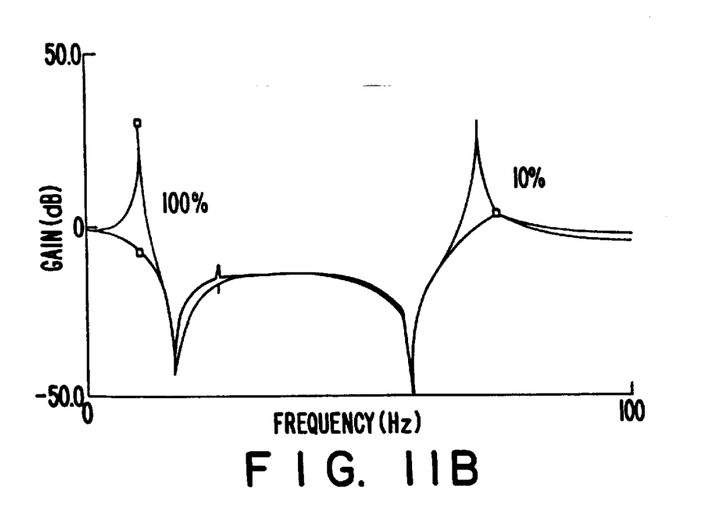
FIG. 11b is a graphical representation of the cantilever strut under forced vibration response showing the change of deflection in relation to frequency, with and without damping.

FIG. 11b shows the measured response of the beam 200 to a varying frequency forced vibration input. The undamped beam is excited by white noise imparted from its actuator and a response is measured from its sensors. At each frequency, the plot shows the measurement of the beams output divided by input, or its transfer function. The same data is plotted when the active damping control loop is closed. This response plot shows the first resonant peak eliminated (100% damping) and the second resonant peak significantly reduced (10% damping).

This beam bending behavior with and without damping is characteristic of the applications of this technology. Any structural beam member that contains strain energy in bending is an excellent candidate.

General

As illustrated in FIG. 9, the modular control patch 19 of the foundation member 33 in the smart structure is attached to a surface 36 of a structure 35. Being preformed and tested, and self-contained and finished with control electronics 13, the patch 19 and control electronics 13 can be easily mass produced. Faults in any of the control electronics 13 can easily be repaired or replaced from the structure without impacting structure characteristics.

The miniature control electronics 13 being discrete, and contained in a self-contained connector 113, the connector 113 is attached directly or indirectly on to the smart structure. The patch 19 can function independently or in a slave configuration to control the foundation member 33.

The mechanical/electrical attachment is an interface connector button board 14 or other connector techniques which are reliable structurally and electrically under a mechanical strain field. The electrical interface with the portions remote from the patch 19 consist of a serial harness that supplies electrical power and command/communication signals through the micro-miniature connector 20. The miniature structure is low in power consumption, light weight and rugged to survive hostile environments.

The apparatus and system of the invention provides for redundancy and autonomy in activated structure design. Thus, if any one or more of the modular patches 19 or the support electronic controls 13 become defective, other patches 19 effectively can control movement of the foundation member 33.

By providing modular patch 19, there is avoided the need for complex harness constructions which would otherwise be used to control the sensors 10 and 11 and actuators 12 on a strut, as illustrated in FIG. 3. The provision of the control electronics 13 locally and on-site in adjacency with each actuator 12 and sensor sets 10 and 11 provides significant advantages in that the wiring to the strut 16 is significantly simplified. Thus, each patch unit 19 has local control electronics 113 in local close physical, and optionally, integrated relationship with the control patch 19.

In some situations, two sets of actuator/sensors 10, 11, and 12 can be connected with a single control electronic system 13. The control electronics 13 are in close adjacency with the pair of actuator/sensors 10, 11 and 12 of each control patch 19.

The characteristic of having multiple actuator/sensors units 10, 11, and 12 located on the foundation member 33, each controlling a segment of the foundation member 33, provides in sum an overall control of the foundation member 33.

By having the control electronics 13 removable or added after a sensor/actuator unit control patch 19 is embedded in a PZT, there is avoided the consequence of subjecting the electronics to undue vibration, thermal cycling, thermal vacuum, and other testing or handling which could otherwise impact the integrity of the electronics. Thus, the risk of electronic failure and the ability to remove faulty electronics is considerably enhanced. A configuration where electronics are removably connected with the patch unit 19, but at the same time connected with the patches in a manner avoids complex harness and wiring connections with the actuator/sensors of each patch 19.

In different applications of the invention, multiple, and as many as several hundred, sensor/actuator patches 19 can be located on a foundation member 33. In a retrofit situation, this would be effected by affixing the patches 19 onto the surface 36 of the foundation member 33 in a manner effective to transfer strain between the foundation member 33 and the patches 19. Each or several units 19 would be separately controlled by dedicated electronics 13 for the actuator/sensor patch unit 19 thereby to control the overall motion of the foundation member 33. In some situations, the actuator/sensor patch 19 can be embedded in a procedure in a composite or bonded onto a composite or metallic structure. It can also be affixed to the outside of the foundation member 33 in a mechanically bonded manner.

In some forms of the invention, the control electronics 13 is formed integrally into a combined unit patch with the patch assembly 19. As such, the integral electronics patch 19 and 13 can be located locally as desired on the foundation member 33. Any integral unit 19 and 13 which is defective can be electronically or mechanically removed from operative interaction with the foundation member and a central electronic control.

Applications of the invention include aerospace purposes in spacecraft, aircraft, and military vehicle vibration, shape control, and health monitoring. Suppression of movement in different directions, such as axial, bending and torsion can be controlled with the modular control patch 19. Forces, strains or vibrations can be imparted or damped with the control patch 19.

Also, the invention can be applied to retain static control of foundation members and control deformity of structures. When vibration of panels is reduced, then noise can be reduced since there is less vibration, for instance, in vehicles such as planes, and automobiles.

Other applications of the invention include structural health monitoring such as in buildings, or bridges or different planar surfaces such as the skin of wings of aircraft.

The modular self-contained control member which is controllable in terms of the invention provides for a reduction in weight and size of about 75% over prior art controlled members.

Many other examples of the invention exist, each differing from others in matters of detail only. For instance, different combinations of sensors and actuators can be used, namely single or multiple actuators with a single or multiple sensors. While a 90° phase shift by the compensator effects damping in the foundation member in that the phase shift is at the resonance frequency of the structure, there may also be a 180° phase shift. This would result in noise cancellation rather than damping where a forced vibration is imparted to a structure, which vibration is not on or near the resonance frequency. The 180° phase shift acts as an active noise cancellation device.

The invention is to be determined solely in terms of the following claims.

What is claimed is:

1. A pre-formed control patch for controlling strain in a foundation member, the patch comprising a base, a piezoelectric sensor and a piezoelectric actuator located in operative relative relationship, means for placing the patch in operative relationship with the foundation member whereby the sensor detects a strain in the foundation member and whereby the actuator imparts a strain-inducing force to the foundation member, and including means for connecting control electronics in operative relationship with the patch.

2. A control patch as claimed in claim 1 including means for locating control electronics in physical abutment with the patch.

3. A control patch as claimed in claim 1 wherein the means for connecting the electronic control electronics includes an interface for location between the patch and the control electronics, the interface being adapted for supporting the control electronics in strain isolation from the base.

4. A control patch as claimed in claim 1 wherein the means for placing the patch comprises the patch being bonded to the foundation member.

5. A control patch as claimed in claim 1, wherein the piezoelectric sensor is spaced laterally from the piezoelectric actuator, the patch further comprising a graphite element for at least partly encapsulating the base, the sensor and the actuator.

6. A control patch as claimed in claim 5 including access means in the graphite element for permitting connection between the electronic control means and the patch.

7. A control patch as claimed in claim 2 wherein the means for locating the control electronics in physical abutment with the assembly comprises a strain-forgiving interface connection.

8. A foundation member comprising multiple control patches as claimed in claim 1, the multiple control patches being spaced selectively about the foundation member.

9. A control patch as claimed in claim 1 wherein the means for placing the patch comprises the patch being imbedded in the foundation member.

10. A foundation member comprising a control patch as claimed in claim 1.

11. A device for controlling strain in a foundation member comprising an assembly being a piezoelectric sensor and a piezoelectric actuator located in operative relative relationship, local control electronics, means for operatively connecting the local control electronics between the assembly of the sensor and the actuator, and means for placing the assembly in operative relationship with the foundation member whereby the sensor detects a strain in the foundation member and whereby the local control electronics processes a signal from the sensor and activates the actuator, and the actuator imparts a force to the foundation member.

12. A device as claimed in claim 11 wherein local control electronics comprises an input stage for amplifying an analog signal from the piezoelectric sensor, compensator means for dynamically processing the amplified signal, and a drive amplifier for receiving the processed signal and activating the piezoelectric actuator.

13. A device as claimed in claim 12 wherein the compensator means applies a frequency-dependent electric phase shift relative to a mechanical resonance of a foundation member thereby to provide a signal for suppressing vibrations of the foundation member through the actuator.

14. A device as claimed in claim 12 wherein the compensator means is an analog device including filtering means having a cutoff frequency substantially tuned to match mechanical characteristics of the foundation member.

15. A device as claimed in claim 14 wherein the filtering means includes capacitor means and resistor means, an effective capacitance and a resistance of the filtering means being selected for achieving a desired tuning frequency.

16. A device as claimed in claim 12 wherein the drive amplifier includes a lead-lag circuit, the lead-lag circuit reducing a gain of the drive amplifier at a selected frequency related to the actuator and acting to minimize oscillation at the selected frequency.

17. A device as claimed in claim 12 wherein the compensator means applies a frequency dependent electric gain relative to a mechanical resonance of a foundation member thereby to provide a signal for suppressing vibrations of the foundation member through the actuator.

18. A device as claimed in claim 12 wherein the compensator means applies a frequency dependent combination of electric gain and phase shift relative to a mechanical resonance of a foundation member thereby to provide a signal for suppressing vibrations of the foundation member through the actuator.

19. A device as claimed in claim 11 wherein the assembly is a pre-formed patch.

20. A foundation member comprising multiple numbers of the device as claimed in claim 8, the multiple numbers of the device each being spaced selectively about the foundation member.

21. A device as claimed in claim 11 wherein the local control electronics is embedded in the means for operatively connecting.

22. A pre-formed control patch for controlling strain in a foundation member, the patch comprising a base; a piezoelectric first sensor and a plurality of piezoelectric actuators located in operative relative relationship, the actuators being located in a string array and fixedly located on the base; an intermediate encapsulation layer having cavities for the actuators, the intermediate encapsulation layer being fixedly located on the base and the actuators, the first sensor being fixedly located on the intermediate encapsulation layer in co-located relation with the string array of actuators; a second piezoelectric sensor fixedly located on the intermediate encapsulation layer and spaced laterally in nearly-colocated relation with the string array; an outer encapsulation layer having cavities for the sensors, the outer encapsulation layer being fixedly located on the intermediate encapsulation layer and the sensors; a graphite tape overwrap affixed to the outer encapsulation layer; and means for placing the patch in operative relationship with the foundation member whereby the sensor detects a strain in the foundation member and whereby the actuators impart a strain-inducing force to the foundation member; means for connecting control electronics in operative relationship with the patch.

23. A method for controlling strain in a foundation member comprising the steps of providing an assembly comprising a piezoelectric sensor and a piezoelectric actuator; locating the assembly in operative relative relationship with the foundation member; and connecting local control electronics between the sensor and the actuator without coupling strain between the assembly and the local control electronics, whereby when the sensor detects a strain in the foundation member the control electronics processes a signal from the sensor for the actuator, the actuator imparts a force to the foundation member.

24. A method as claimed in claim 23 wherein the control electronics amplifies an analog signal from the piezoelectric sensor, dynamically compensates the amplified signal, amplifies the compensated signal, and activates the piezoelectric actuator.

25. A method of controlling strain in a foundation member comprising the steps of providing an assembly comprising a base, a piezoelectric sensor and a piezoelectric actuator coupled to the base; locating the assembly in operative relative relationship on the foundation member; and connecting control electronics in operative relationship with the assembly, whereby the sensor detects a strain in the foundation member and whereby the actuator imparts a force to the foundation member in response to the strain.

26. A method as claimed in claim 25 including locating the control electronics in physical abutment with the assembly.

27. A method as claimed in claim 26 including bonding the assembly to the foundation member.

28. A method as claimed in claim 26 including laterally spacing the sensor from actuator, and encapsulating the assembly in graphite reinforced plastic.

29. A method as claimed in claim 28 including providing an access in the graphite reinforced plastic for permitting connection between the control electronics and the assembly.

30. A method as claimed in claim 26 including embedding the assembly within the foundation member.

* * * * *